(12) United States Patent
Rado (10) Patent No.: US 10,677,233 B2
(45) Date of Patent: Jun. 9, 2020

(54) VIBRATION-DAMPENING AIR COMPRESSOR ASSEMBLY

(71) Applicant: Scott Technologies, Inc., Boca Raton, FL (US)

(72) Inventor: Gordon E. Rado, Waxhaw, NC (US)

(73) Assignee: Scott Technologies, Inc., Monroe, NC (US)

(*) Notice: Subject to any disclaimer, the term of this patent is extended or adjusted under 35 U.S.C. 154(b) by 317 days.

(21) Appl. No.: 15/517,062

(22) PCT Filed: Oct. 6, 2015

(86) PCT No.: PCT/US2015/054164
§ 371 (c)(1),
(2) Date: Apr. 5, 2017

(87) PCT Pub. No.: WO2016/057470
PCT Pub. Date: Apr. 14, 2016

(65) Prior Publication Data
US 2017/0298918 A1    Oct. 19, 2017

Related U.S. Application Data

(60) Provisional application No. 62/060,187, filed on Oct. 6, 2014.

(51) Int. Cl.
*F04B 39/00* (2006.01)
*F04B 35/04* (2006.01)
(Continued)

(52) U.S. Cl.
CPC ........ *F04B 39/0044* (2013.01); *F04B 25/005* (2013.01); *F04B 35/04* (2013.01);
(Continued)

(58) Field of Classification Search
CPC .... F04B 39/0044; F04B 39/127; F04B 39/00; F04B 35/04; F04B 25/005; F16F 15/00
(Continued)

(56) References Cited

U.S. PATENT DOCUMENTS 3,477,670 A * 11/1969 Sloyan .................. F16F 15/067
 108/10
3,734,122 A * 5/1973 Cousins ............... A61C 1/0007
 137/340
(Continued)

FOREIGN PATENT DOCUMENTS

AU    729486 B2    8/1998
CN    1182175 A    5/1998
(Continued)

OTHER PUBLICATIONS

Office Action and Search Report and English language thereof, dated Jul. 4, 2018 issued in corresponding Chinese Application No. 201580054173.4, consisting of 15 pages.
(Continued)

*Primary Examiner* — Patrick Hamo
*Assistant Examiner* — David N Brandt (57) ABSTRACT

An air compressor assembly may include a support structure, an operating unit including a compressor operatively connected to a motor through at least one drive belt, and at least one vibration isolator that is positioned between at least a portion of the support structure and at least a portion of the operating unit. The vibration isolator(s) is configured to dampen vibratory energy generated by the operating unit.

18 Claims, 4 Drawing Sheets

(51) Int. Cl.
*F16F 15/00* (2006.01)
*F04B 25/00* (2006.01)
*F04B 39/12* (2006.01)

(52) U.S. Cl.
CPC .......... *F04B 39/00* (2013.01); *F04B 39/127* (2013.01); *F16F 15/00* (2013.01)

(58) Field of Classification Search
USPC .................. 248/560, 562, 580, 636, 638
See application file for complete search history.

(56) References Cited

U.S. PATENT DOCUMENTS

| | | | |
|---|---|---|---|
| 3,768,324 A | 10/1973 | Vanderstegen-Drake | |
| 4,789,127 A | 12/1988 | Gleason, Jr. | |
| 5,378,119 A * | 1/1995 | Goertzen | F04B 35/04 312/236 |
| 5,551,845 A | 9/1996 | Milam | |
| 5,785,620 A | 7/1998 | Beutel | |
| 6,004,112 A | 12/1999 | Cook | |
| 6,336,794 B1 * | 1/2002 | Kim | F04B 39/0044 417/363 |
| 6,530,303 B1 * | 3/2003 | Parks | B23D 45/067 83/473 |
| 7,927,081 B2 * | 4/2011 | MacNeil | F04B 17/03 417/361 |
| 2003/0133812 A1 | 7/2003 | Puff et al. | |

FOREIGN PATENT DOCUMENTS

| | | |
|---|---|---|
| CN | 2457401 Y | 10/2001 |
| CN | 2888190 Y | 4/2007 |
| CN | 101634299 A | 1/2010 |
| CN | 201574915 U | 9/2010 |
| DE | 102008024671 A1 | 11/2009 |
| JP | H06-346881 A | 12/1994 |
| JP | H09256950 A | 9/1997 |
| JP | 201212984 A | 1/2012 |
| RU | 133789 U1 | 10/2013 |
| SU | 297233 A | 6/1982 |

OTHER PUBLICATIONS

International Search Report and Written Opinion for PCT Application PCT/US2015/054164 dated Jan. 14, 2016, consisting of 5 pages.
AU Search Report dated Sep. 11, 2018 (9 pages).

* cited by examiner

VIBRATION-DAMPENING AIR COMPRESSOR ASSEMBLY

CROSS-REFERENCE TO RELATED APPLICATIONS

This application is a Submission Under 35 U.S.C. § 371 for U.S. National Stage Patent Application of International Application Number: PCT/US2015/054164, filed Oct. 6, 2015 entitled "VIBRATION-DAMPENING AIR COMPRESSOR ASSEMBLY," which claims priority to U.S. Provisional Patent Application No. 62/060,187 filed Oct. 6, 2014, entitled "VIBRATION-DAMPENING AIR COMPRESSOR ASEMBLY," entirety of both which are incorporated herein by reference.

FIELD OF THE DISCLOSURE

Embodiments of the present disclosure generally relate to systems and methods for filling fluid containers, such as pressurized fluid cylinders, tanks, and the like, and, more particularly, to vibration-dampening air compressor assemblies that may be used to re-fill fluid containers with pressured air.

BACKGROUND OF THE DISCLOSURE

Pressurized fluid cylinders are used in various settings. For example, a self-contained breathing apparatus (SCBA) typically includes an air cylinder that is used to provide safe, clean air to an individual for breathing. An SCBA is configured to be worn by individuals, such as rescue workers, firefighters, and others, to provide breathable air in a hazardous or otherwise unsafe atmosphere. When configured for use underwater, an SCBA is typically referred to as a self-contained underwater breathing apparatus (SCUBA).

An SCBA typically includes a high-pressure tank (for example, 4,500 psi) that connects to a pressure regulator, which in turn connects an inhalation connection, such as a mouthpiece, mouth mask, or face mask. At least one of the tank, regulator, and inhalation connection may be secured to a carrying frame that allows an individual to carry the SCBA on his/her back, for example.

After use, a fluid tank or cylinder needs to be re-filled for future use. An air compressor assembly may be used to re-fill the fluid tank or cylinder. One known type of compressor assembly provides a vertical assembly in which a compressor is positioned directly above an electric motor that drives the compressor. A vertical compressor assembly may include a box-shaped sheet metal frame that houses components of the assembly. As such, the compressor assembly may be contained within a relatively small space.

Additionally, because the motor is positioned below the compressor, the weight of the motor self-tensions the drive belt that operatively connects the motor to the compressor. However, the motor and the compressor are typically rigidly attached to the frame. Accordingly, during operation, the entire compressor assembly may shake, which generates noise, and may damage components of the assembly.

As noted, a known vertical compressor assembly may include a box frame that supports all of the components. During operation, the entire assembly shakes and/or rattles due to vibration generated by the compressor. In order for the belt tensioning device to properly function, the relationship between the compressor and the motor typically remains fixed. In order to accomplish this, however, the compressor is typically rigidly fixed to the box frame. Moreover, in order for the box frame to maintain structural integrity, an upper attachment plate for the compressor is typically rigidly fixed to the box walls. Vibrations generated by the compressor and/or motor generate noise through such rigid connections.

SUMMARY OF THE DISCLOSURE

Certain embodiments of the present disclosure provide an air compressor assembly that may include a support structure, an operating unit including a compressor operatively connected to a motor through at least one drive belt, and at least one vibration isolator that is positioned between at least a portion of the support structure and at least a portion of the operating unit. The vibration isolator(s) is configured to dampen vibratory energy generated by the operating unit.

The air compressor assembly may include a mounting plate. The operating unit may securely connect to the mounting plate. The vibration isolator(s) is positioned between a lower surface of the mounting plate and an upper surface of the support structure.

In at least one embodiment, the vibration isolation includes at least one vibration isolator, preferably a plurality of vibration isolators and most preferably four isolation vibration isolators. For example, a vibration isolator may be positioned at each corner of a mounting plate. Alternatively, more or less vibration isolators may be used. Each vibration isolator may include a main body formed of motion damping material, such damping material preferably being rubber.

The operating unit may include a hinged self-tensioning plate that securely connects the compressor to the motor.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an air compressor assembly that isolates a compressor and motor from rest of the assembly while preserving the structural integrity of a support structure, such as a box frame or housing. In at least one embodiment, one or more vibration isolators are secured to a mounting frame that secures an operating unit, which may include the compressor and the motor to the support structure. The vibration isolators may be disposed between the mounting frame and a surface of the support structure in order to dampen any vibratory energy generated by the operating unit so that such energy is eliminated, minimized, or otherwise reduced. Accordingly, the vibratory energy that may be generated by the operating unit may be attenuated or otherwise prevented from being transmitted into the support structure, thereby eliminating, minimizing, or otherwise reducing any noise.

Figure 1:
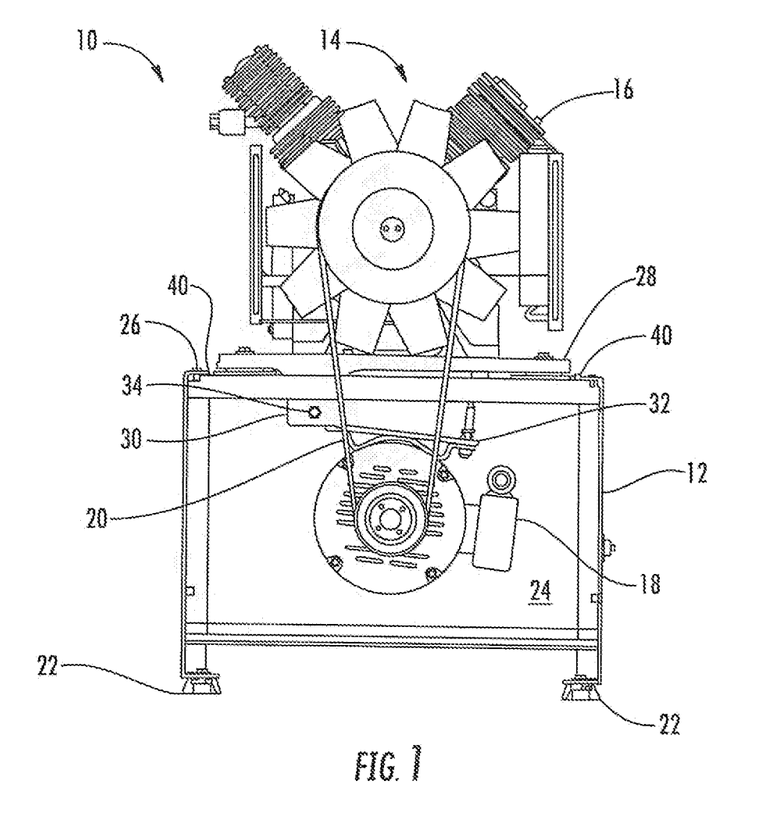
FIG. 1 illustrates a lateral view of an air compressor assembly, according to an embodiment of the present disclosure.

FIG. 1 illustrates a lateral view of an air compressor assembly 10, according to an embodiment of the present disclosure. The air compressor assembly 10 may include a support structure 12, such as a box frame, housing, or the like, that supports an operating unit 14, which may include an air compressor 16 operatively connected to a motor 18 through a drive belt 20.

The support structure 12 may include adjustable feet 22, which may be or include separate and distinct vibration isolators. The support structure 12 may include a frame-like structure that defines an interior chamber 24 and a top surface 26.

Figure 2:
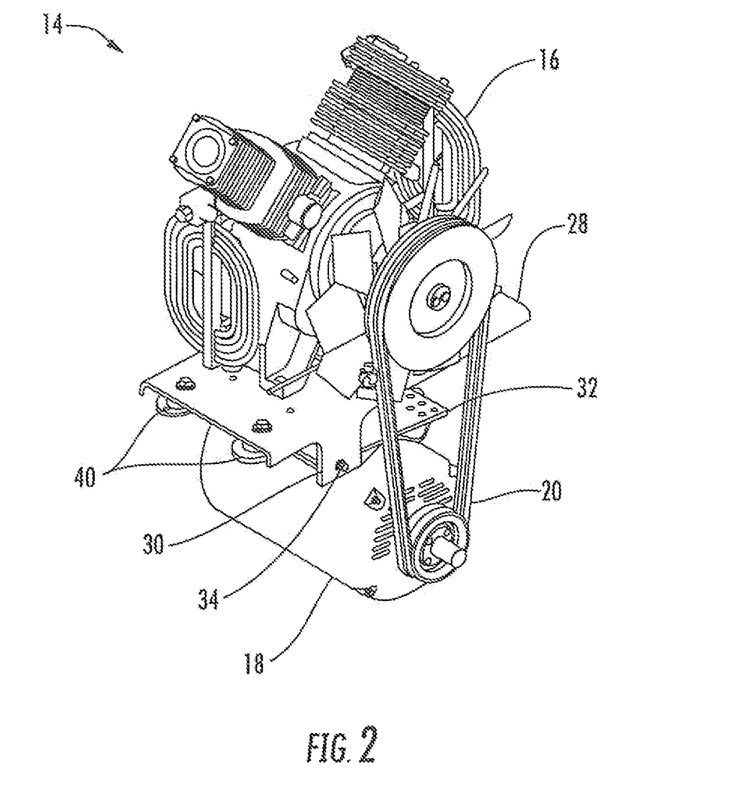
FIG. 2 illustrates a perspective top view of an operating unit of an air compressor assembly, according to an embodiment of the present disclosure.

FIG. 2 illustrates a perspective top view of the operating unit 14 of the air compressor assembly 10, according to an embodiment of the present disclosure. The compressor 16 mounts to a top surface of a mounting plate 28 that includes opposed mounting tabs 30 that connect to a hinged self-tensioning plate 32 through a hinge pin 34. The motor 18 secures to a lower surface of the hinged self-tensioning plate 32 and is configured to be suspended within the interior chamber 24 of the support structure 12.

One or more vibration isolators 40 extend downwardly from a lower surface of the mounting plate 28. The vibration isolators 40 may include a dampening main body, which may be formed of rubber or other such elastomeric materials, and may secure to the mounting plate 28 through fasteners, such as bolts, screws, or the like. Alternatively, the vibration isolators 40 may be adhesively secured or bonded to the mounting plate 28.

As shown in FIG. 1, the mounting plate 28 securely connects to the top surface 26 of the support structure 12 through the vibration isolators 40. As such, the vibration dampening material of the vibration isolators 40 is positioned between the top surface 26 of the support structure 12 and the lower surface of the mounting plate 28, thereby isolating the operating unit 14 from the support structure 12.

Figure 3:
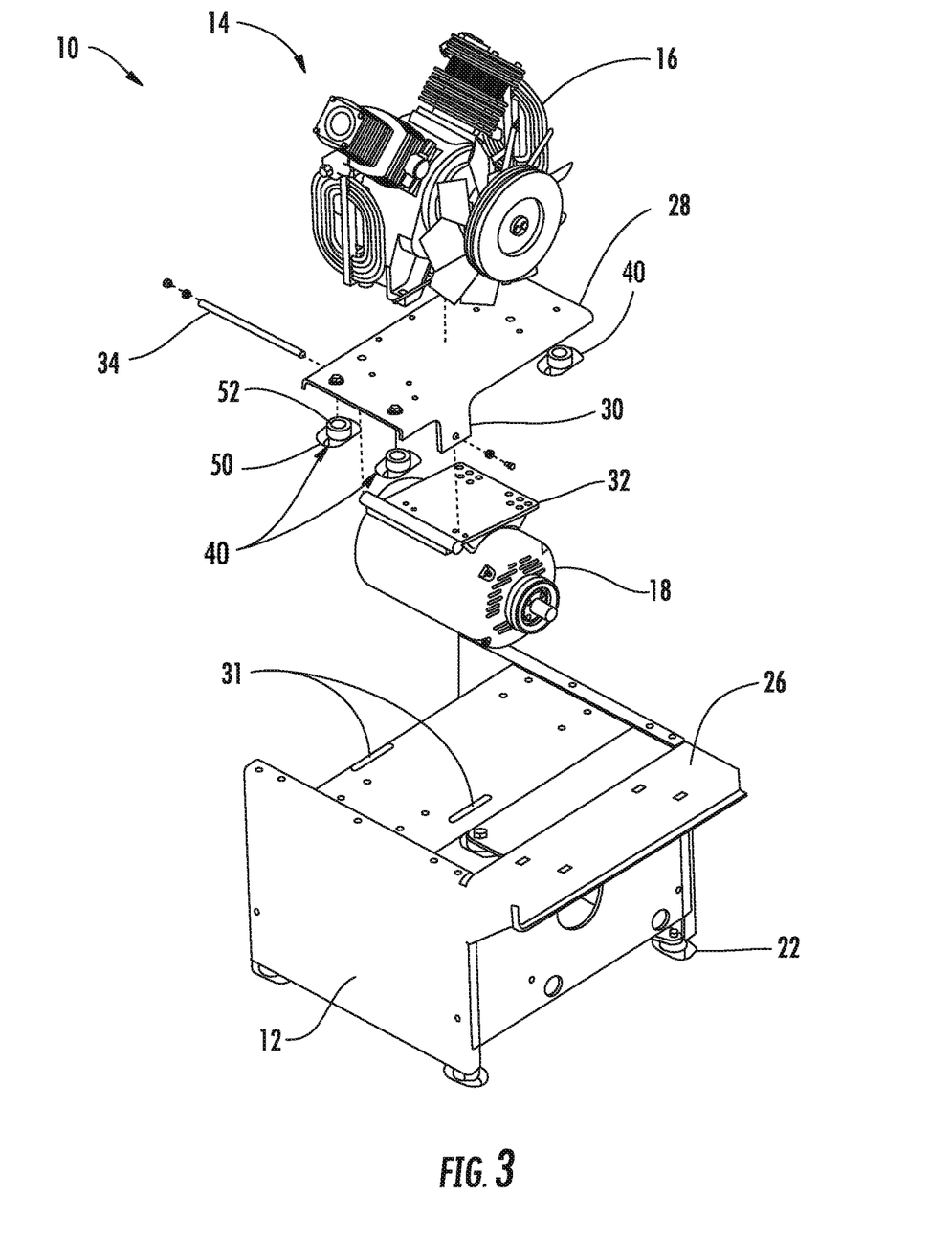
FIG. 3 illustrates a perspective exploded view of an air compressor assembly, according to an embodiment of the present disclosure.

FIG. 3 illustrates a perspective exploded view of the air compressor assembly 10, according to an embodiment of the present disclosure. As shown, four vibration isolators 40 may be used. However, more or less vibration isolators 40 than shown may be used. Each vibration isolator 40 may include a flat base 50 and a tubular rim 52 extending upwardly therefrom. A fastener-receiving channel, such as a threaded sleeve, may extend through the tubular rim 52. Alternatively, the vibration isolators 40 may be formed as different shapes and sizes than shown. For example, the vibration isolators 40 may be flat blocks of rubber.

Figure 4:
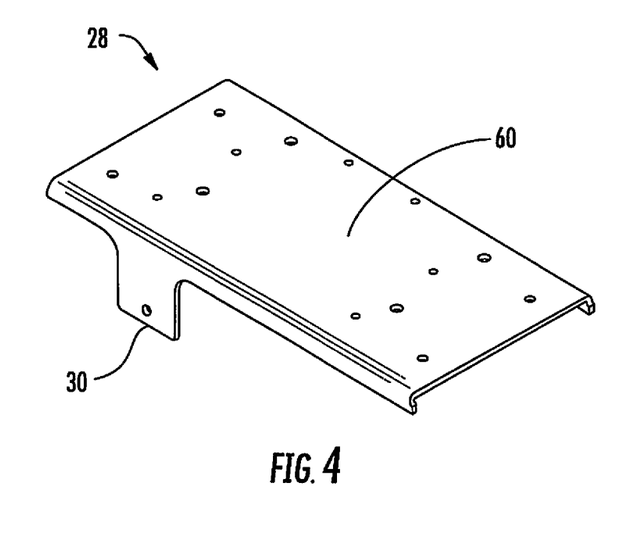
FIG. 4 illustrates a perspective top view of a mounting plate that is configured to securely mount an operating unit to a support structure, according to an embodiment of the present disclosure.

FIG. 4 illustrates a perspective top view of the mounting plate 28 that is configured to securely mount the operating unit 14 to the support structure 12, according to an embodiment of the present disclosure. As shown, the compressor 16 is configured to mount to a top surface 60 of the mounting plate 28.

Referring to FIGS. 1-4, embodiments of the present disclosure provide an air compressor assembly that may include a mounting plate to which both the compressor and the motor are attached. The mounting plate is isolated from the support structure, such as a box frame, by vibration isolators, such as rubber isolation dampers. Embodiments of the present disclosure preserve both the structural integrity of the support structure and the self-tensioning feature for the drive belt(s). Mounting tabs may be incorporated onto the mounting plate that fit through clearance slots 31 in the upper surface of the support structure. The mounting tabs allow the hinged self-tensioning plate to be secured within the support structure, and suspend the motor within the internal chamber of the support structure. Consequently, both the compressor and the motor along with the drive belt(s) and self-tensioning plate may be isolated from the rest of the support structure. External vibration and resulting noise can thus be eliminated, minimized, or otherwise reduced.

Embodiments of the present disclosure provide an air compressor assembly that preserves the structural integrity of the support structure while allowing the compressor and motor to be isolated from the support structure. The function of the self-tensioning drive belt is preserved as well. The compressor may be fastened to an isolated mounting plate that attaches to the support structure with four vibration isolators, for example. The motor may also attach to the isolated mounting plate via the hinged self-tensioning plate and hinge pin. The mounting tabs on the isolated mounting plate pass through clearance slots on the top surface the box frame, as shown in FIG. 3, thereby maintaining the structural integrity of the support structure. As such, the motor may be located inside the support structure and fastened to the isolation mounting plate so that it moves with the compressor as the vibration isolators deflect as vibratory energy is directed therein.

The mounting plate may be symmetrically formed with both side edges folded over to increase flexural stiffness. Further, the mounting tabs for the hinge pin may extend downwards so that they will protrude through the slots in the top surface of the support structure.

The compressor system as described is operated by pushing a start button, which enables power to the electric drive motor. The drive motor spins the compressor via the drive belt(s) to produce pressurized air. The tension on the drive belts is maintained by the weight of the electric motor located by the hinge pin and supported by the drive belt(s). The compressor and drive motor are constrained to move together as a unit by the hinge pin and the tension on the belt(s), but are isolated from and free to move relative to the support structure because of the vibration isolators. The result is that the level of vibration and noise of the support structure and hardware items attached to it is greatly reduced.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An air compressor assembly comprising:
   a support structure;
   an operating unit including a compressor, an electric motor, a mounting plate having a top surface, a hinged self-tensioning plate, and at least one drive belt, the compressor operatively connected to the electric motor through the at least one drive belt, the compressor being coupled to the top surface of the mounting plate and positioned above the support structure and the electric drive motor and the hinged self-tensioning plate positioned within the support structure;
   the electric motor supported below the compressor and suspended from the hinged self-tensioning plate, the hinged self-tensioning plate being connected to the mounting plate by a hinge pin, the electric motor being supported by the at least one drive belt such that a weight of the electric motor applies a tension to the at least one drive belt; and
   at least one vibration isolator that is positioned between the top surface of the support structure and the mounting plate, the at least one vibration isolator being configured to dampen vibratory energy generated by the operating unit, the compressor and the electric motor moving together as a unit but being isolated from and free to move relative to the support structure.

2. The air compressor assembly of claim 1, wherein the mounting plate includes an anchoring component for the hinge pin, the electric motor and hinged self-tensioning plate being securely connected to the mounting plate through the hinge pin such that the operating unit can move relative to the support structure while maintaining the tension on the drive belt.

3. The air compressor assembly of claim 2, wherein the support structure is a box frame including at least one opening in the top surface, the anchoring component passing through the at least one opening.

4. The air compressor assembly of claim 1, wherein the compressor and the mounting plate are located above the top surface of the support structure.

5. The air compressor assembly of claim 1, wherein the at least one vibration isolation includes four separate blocks of cushioning material.

6. The air compressor assembly of claim 1, wherein the hinged self-tensioning plate securely connects the compressor to the motor.

7. The air compressor assembly of claim 1, wherein the at least one vibration isolator includes a main body formed of rubber.

8. The air compressor assembly of claim 1, wherein the support structure forms an open bottom, closed sides, and closed top.

9. The air compressor of claim 8, wherein the support structure forms a box shape defining a chamber therein.

10. The air compressor assembly of claim 1, wherein the at least one drive belt includes a plurality of drive belts.

11. The air compressor of claim 2, wherein the anchoring component forms at least two mounting tabs to support the hinge pin.

12. The air compressor of claim 3, wherein the at least one opening in the box frame includes at least two slots.

13. The air compressor assembly of claim 4, wherein the electric motor is suspended from the hinged self-tensioning plate within an interior of the support structure.

14. The air compressor of claim 5, wherein the blocks of cushioning material are made of rubber.

15. A system for dampening vibration, the system comprising:
   an air compressor;
   a mounting plate coupled to the air compressor, the mounting plate including at least one mounting tab;
   a motor;
   a hinged self-tensioning plate hingedly connected to the mounting plate and securely connected to the motor;
   a hinge pin, the hinge pin hingedly connecting the hinged self-tensioning plate to the at least one mounting tab;
   a support structure including a top surface and defining a chamber, the mounting plate being on but not in direct contact with the top surface of the support structure, the motor being suspended from the hinged self-tensioning plate within the chamber; and
   at least one vibration isolator located between the mounting plate and the top surface of the support structure, the at least one vibration isolator isolating the air compressor, the motor, and the hinged self-tensioning plate from the support structure,
   the air coimpressor, the mounting plate, the motor, and the hinged self-tensioning plate being together movable relative to the support structure.

16. The system of claim 15, further comprising a drive belt, the drive belt operatively connecting the air compressor and the motor.

17. An air compressor assembly comprising:
   an air compressor;
   a motor;

a support structure having a top surface and defining a chamber; and a hinged mounting assembly, the air compressor being coupled to a first component of the hinged mounting assembly and the motor being coupled to a second component of the hinged mounting assembly, the first component of the hinged mounting assembly being coupled to the top surface of the support strucutre and the motor being suspended within the chamber of the support structure form the second component of the hinged mounting assembly, the hinged mounting assembly, the air compressor, and the motor being isolated from and movable relative to the support structure.

18. The air compressor assembly of claim 17, further comprising at least one vibration isolator located between the first component of the hinged mounting assembly and the top surface of the support structure.

* * * * *

UNITED STATES PATENT AND TRADEMARK OFFICE
CERTIFICATE OF CORRECTION

| | | |
|---|---|---|
| PATENT NO. | : 10,677,233 B2 | Page 1 of 1 |
| APPLICATION NO. | : 15/517062 | |
| DATED | : June 9, 2020 | |
| INVENTOR(S) | : Gordon E Rado | |

It is certified that error appears in the above-identified patent and that said Letters Patent is hereby corrected as shown below:

In the Specification

Column 1
Line 12, after "62/060,187" insert -- , --.
Line 14, delete "ASEMBLY,'"' and insert -- ASSEMBLY," the --, therefor.

In the Claims

Column 5
Line 47, Claim 1, after "electric" delete "drive".
Line 50, Claim 1, delete "supported" and insert -- positioned --, therefor.
Line 58, Claim 1, delete "the" and insert -- a --, therefor.

Column 6
Line 6, Claim 3, after "box" insert -- frame, the box --.
Line 14, Claim 5, delete "isolation" and insert -- isolator --, therefor.
Line 18, Claim 6, before "motor." insert -- electric --.
Line 23, Claim 8, after "and" insert -- a --.
Line 25, Claim 9, after "compressor" insert -- assembly --.
Line 29, Claim 11, after "compressor" insert -- assembly --.
Line 32, Claim 12, after "compressor" insert -- assembly --.
Line 37, Claim 14, after "compressor" insert -- assembly --.
Line 59, Claim 15, delete "coimpressor," and insert -- compressor, --, therefor.

Column 7
Line 8, Claim 17, delete "strucutre" and insert -- structure --, therefor.
Line 10, Claim 17, delete "form" and insert -- from --, therefor.

Signed and Sealed this
Twenty-ninth Day of December, 2020

Andrei Iancu
*Director of the United States Patent and Trademark Office*